(12) United States Patent
Dorin et al.

(10) Patent No.: US 7,922,243 B2
(45) Date of Patent: Apr. 12, 2011

(54) VEHICLE ROOF HAVING HIGH INHERENT STIFFNESS

(75) Inventors: Florian Dorin, Köln (DE); Stephan Lange, Wuppertal (DE); Roland Brambrink, Ratingen (DE); Ulrich Grosser, Kürten (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/254,409

(22) Filed: Oct. 20, 2008

(65) Prior Publication Data
US 2009/0102246 A1   Apr. 23, 2009

(51) Int. Cl.
*B60J 7/06* (2006.01)
(52) U.S. Cl. ........................ 296/219; 296/214; 160/84.06
(58) Field of Classification Search ................... 296/214, 296/219, 220.01; 160/84.06
See application file for complete search history.

(56) References Cited

U.S. PATENT DOCUMENTS

| 5,421,635 | A |   | 6/1995 | Reinsch et al. |
| 5,823,605 | A | * | 10/1998 | Seargeant ............... 296/100.09 |
| 6,186,587 | B1 |   | 2/2001 | Entenmann |
| 6,382,713 | B2 |   | 5/2002 | Färber |
| 6,485,091 | B2 |   | 11/2002 | Karami et al. |

FOREIGN PATENT DOCUMENTS

| DE | 4415649 | C1 |   | 6/1995 |
| DE | 29607921 | U1 |   | 9/1996 |
| DE | 19650854 | C1 |   | 3/1998 |
| DE | 19711333 |   | * | 9/1998 |
| DE | 19959542 | A1 |   | 6/2001 |
| DE | 29924264 | U1 |   | 9/2002 |
| DE | 10207729 | A1 |   | 9/2003 |
| DE | 10320538 |   | * | 12/2004 |
| EP | 0591644 | A2 |   | 4/1994 |
| EP | 1006012 | A2 |   | 6/2000 |
| EP | 1006013 |   | * | 6/2000 |
| EP | 1125778 | A2 |   | 8/2001 |
| FR | 2866274 | A1 |   | 8/2005 |

* cited by examiner

*Primary Examiner* — Dennis H Pedder
(74) *Attorney, Agent, or Firm* — Connolly Bove Lodge & Hutz LLP

(57) ABSTRACT

A vehicle roof having an opening, a folding arrangement, and a device for receiving the folding arrangement. The folding arrangement has at least two slats made of plastic which are arranged parallel to one another, and the folding arrangement can be retracted, while being folded, into the device in order to at least partially unblock the opening. The folding arrangement closes the opening completely when in the closed position. The slats are curved as a result of bracing when in the closed position and are oriented in a substantially flat and plane-parallel manner when retracted into the device.

7 Claims, 4 Drawing Sheets

VEHICLE ROOF HAVING HIGH INHERENT STIFFNESS

BACKGROUND OF THE INVENTION

1. Priority

Priority is claimed to German Patent Application No. 102007050461.8, filed on Oct. 18, 2007. The aforementioned priority document is incorporated herein by reference in its entirety.

2. Field of the Invention

The field of the present invention relates to vehicle roofs, and in particular vehicle roofs including a folding slat arrangement which may be used to cover and uncover an opening in the roof.

3. Background

There are a number of types of sliding roofs for vehicles, for example rigid, one-piece, transparent and non-transparent sliding roofs. Slatted roofs made of transparent materials are also manufactured. These are described, inter alia, in DE 44 15 649 C1 and EP-A-591 644. EP-A-1 125 778 describes a vehicle roof which is capable of opening and has at least two roof systems which are arranged one behind the other and are capable of opening separately. A feature of these roofs consists in the fact that the combination of individual slats is broken up when it is opened. An additional, separable sealing face between the individual slats is therefore necessary. This requires complex kinematics (for example DE 19959542 A1) and high stiffness of the components of the individual slats in order to maintain the sealing force over the life span. The structure for absorbing the sealing forces reduces the transparent see-through area considerably (by about 50%) and requires a high installation space, a fact which can impair the freedom of design and, in particular, the aerodynamics. Furthermore, the slatted roofs described can be moved exclusively in the longitudinal axis of the vehicle since, on the one hand, the necessary installation space would be too great if they moved together along, for example, the transverse axis of the vehicle, and on the other hand, severe wind noise can occur because of the slats (or components) which protrude from the contour of the vehicle. Window blinds made of glass, which are connected in a material-bonded manner, are also known (DE 29607921). Glass slats of this kind have very high stiffness with, at the same time, high weight and low impact strength.

If glass is used because of its high stiffness (modulus of elasticity about 70000 MPa), its high density is a major disadvantage. Plastics, for example polycarbonates, have a considerably lower density than glass and are, at the same time, just as transparent. However, they have far lower stiffness (modulus of elasticity about 2400 MPa). It is possible these days, by means of complex geometries and, in some cases, complex stiffening elements, to manufacture panoramic roofs which are likewise made of polycarbonate.

SUMMARY OF THE INVENTION

The present invention is directed toward a vehicle roof which is made of plastic and has high inherent stiffness without additional stiffening elements. The vehicle roof includes an opening and comprises a folding arrangement and a device for receiving the folding arrangement. The folding arrangement has at least two slats made of plastic which are arranged parallel to one another, and the folding arrangement can be retracted, while being folded, into the device in order to at least partially unblock the opening. The folding arrangement closes the opening completely when in the closed position. Further, the slats are curved as a result of bracing when in the closed position and are oriented in a substantially flat and plane-parallel manner retracted into the device.

In a first separate aspect of the present invention, the slats, when in the closed position, have a curvature with a radius of 1.5 m to 4 m.

In a second separate aspect of the present invention, the slats, when in the closed position, the slats may be curved in substantially a double manner.

In a third separate aspect of the present invention, the slats, when retracted into the device, have a curvature with a radius between infinite and 4 m.

In a fourth separate aspect of the present invention, each slat is connected to at least one adjacent slat in a material-bonded and/or form-closed manner by elastomer over the predominant part of their longitudinal sides. The elastomer may be a polyurethane, a thermoplastic polyurethane or silicone.

In a fifth separate aspect of the present invention, the roof further comprises two guide rails which include a converging region in the longitudinal axis of the vehicle and a diverging region in the region of the device, such that the converging region causes the slats to curve as a result of bracing, and the diverging region permits the slats to reduce their curvature.

In a sixth separate aspect of the present invention, the vehicle roof has 3, 4, 5 or 6 slats if said slats are oriented longitudinally in relation to the direction of travel, or 7, 8, 9, 10, 11 or 12 slats if said slats are oriented transversely to the direction of travel.

In a seventh separate aspect of the present invention, the plastic may be a polycarbonate or PMMA.

In an eighth separate aspect of the present invention, the folding arrangement may be manufactured in a two-component injection-molding process.

In a ninth separate aspect of the present invention, any of the foregoing separate aspects may be employed in combination.

Accordingly, an improved vehicle roof is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
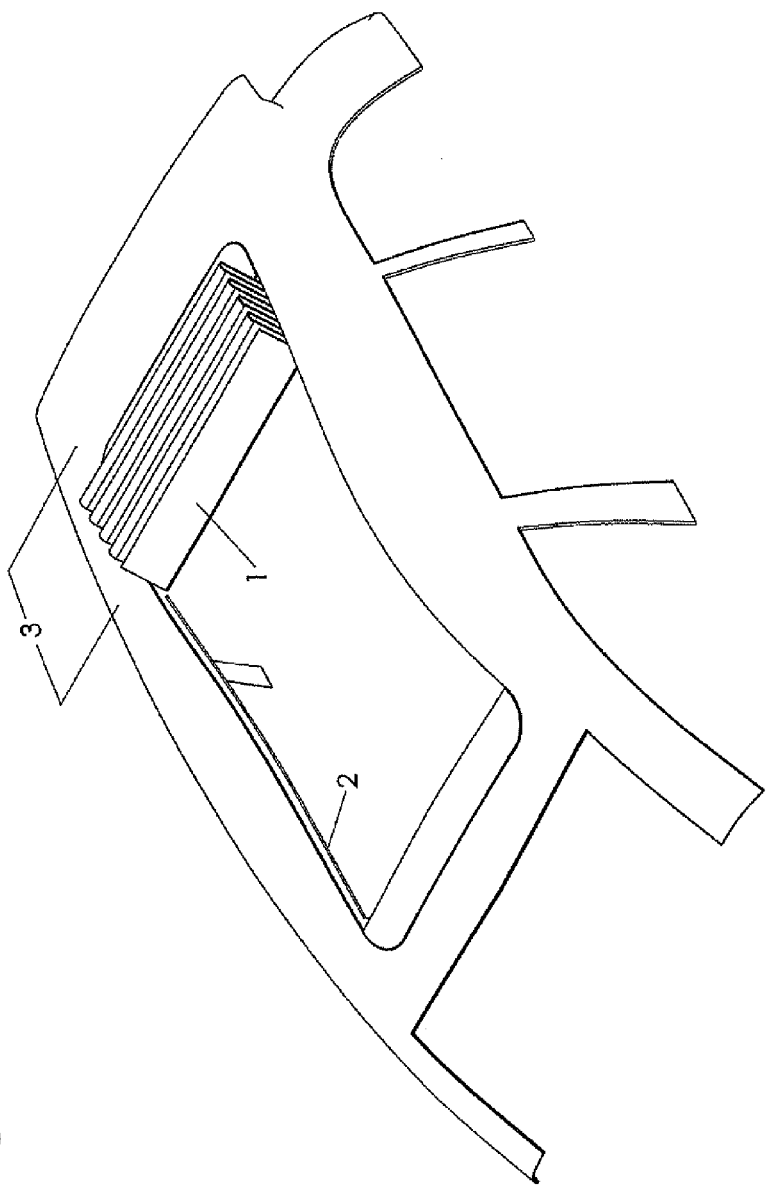
FIG. 1 is an isometric representation of the roof (perspective) with the roof open.

The structure consisting of the slats and the elastomer or hinge is described herein as the "folding arrangement". The term "slats" means laminar and elongated plates made of plastic such as a transparent thermoplastic, for example polycarbonate (PC) or polymethyl methacrylate (PMMA, acrylic glass or Plexiglas® [Röhm GmbH & Co. KG]). The slats may be connected in a material-bonded and/or form-closed manner over the predominant part, i.e. as a rule over 75% and, ideally, 100% of the longitudinal sides of the slats, by hinges or by elastomer such as, for example, polyurethane, thermoplastic polyurethane or silicone.

For the purpose of opening the roof, the folding arrangement is accommodated in a device, for example a hood box or boot lid, which is provided for it. Something of that kind is known, for example, from DE 102 07 729.

Said folding arrangement can be folded up/rolled up into it. The hood is described by an installation space, and may therefore be open or a case. In the open state, therefore, the slats may be located in a concealed or an open manner.

The term "bracing" means that the slats are arched compared to their original state. This arching can be brought about by the pressing of the slats against one another, for example at their end faces.

The expression "curved" means rounding that deviates from the straight in one or two dimensions, i.e. normally the longitudinal and transverse directions of the vehicle. Preference is given to a curvature with a radius of 1.5 m to 4 m and, in a particularly preferred manner, 2 m to 3 m.

The expression "substantially flat" means that the slats are absolutely flat in the geometrical sense, or preferably are not absolutely flat but have a slight "initial curvature" in order to guarantee that they subsequently curve in the right direction. The slats are preferably absolutely flat or have a curvature with a radius between infinite and 4 m and, in a particularly preferred manner, between infinite and 8 m.

The expression "oriented in a substantially plane-parallel manner" means that the slats are arranged so as to be absolutely parallel to one another in the geometrical sense, or have a deviation from parallelism of less than 10%, preferably less than 5% and, in a particularly preferred manner, less than 2%.

The expression "closed position" means that the opening in the vehicle roof is closed by the slats in a substantially raintight manner.

A component that is curved in a double (spherical) manner has its stiffness increased more than in the case of a single curvature. The stiffness of a component is likewise increased if it is subjected to bracing.

The stiffness of a roof can thus be increased by means of a double curvature and the application of pretensioning. This pretensioning is advantageous in the case of slatted roofs because, in the closed state, they are comparable with conventional panoramic roofs and should have a high degree of stiffness. This can be achieved by way of three-dimensional curvatures. Curvature in the longitudinal axis of the vehicle is predetermined by way of the vehicle's geometry, and curvature transversely to the direction of travel can be achieved by bracing or compressing the slats.

The bracing is eased in a continuous manner during the opening process, and is preferably eased in a continuous manner. The curvature is thereby reduced in the course of the opening operation, so that the slats are plane-parallel in relation to one another when fully retracted. In the open state, the slats should advantageously take up the smallest possible installation space, and the curvature may constitute an obstacle to this—particularly in the case of slats which are connected in a material-bonded and/or form-closed manner—since the slats which are folded up convexly/concavely would be mutually repelled by one another. In the state in which the slatted roof is open, therefore, flat slats are preferred. All slats [1] are flat and plane-parallel when in the state in which they are relieved of tension—referred to herein as the original state (as shown in FIGS. 1-3, where the slats are in the open position).

Figure 5:
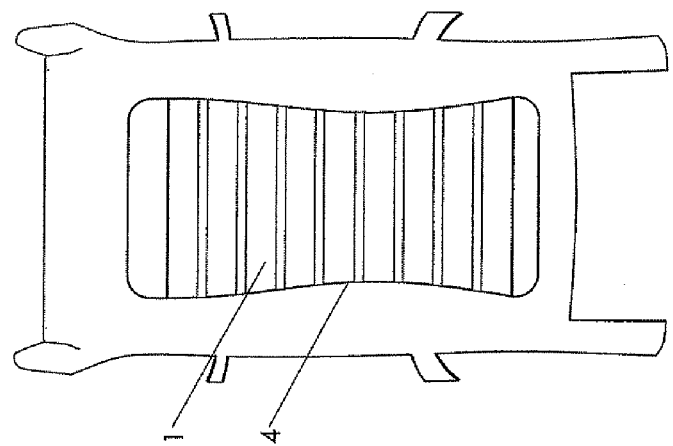
FIG. 5 is a plan view of the roof with the roof closed and a path of biconcave shape.
Figure 4:
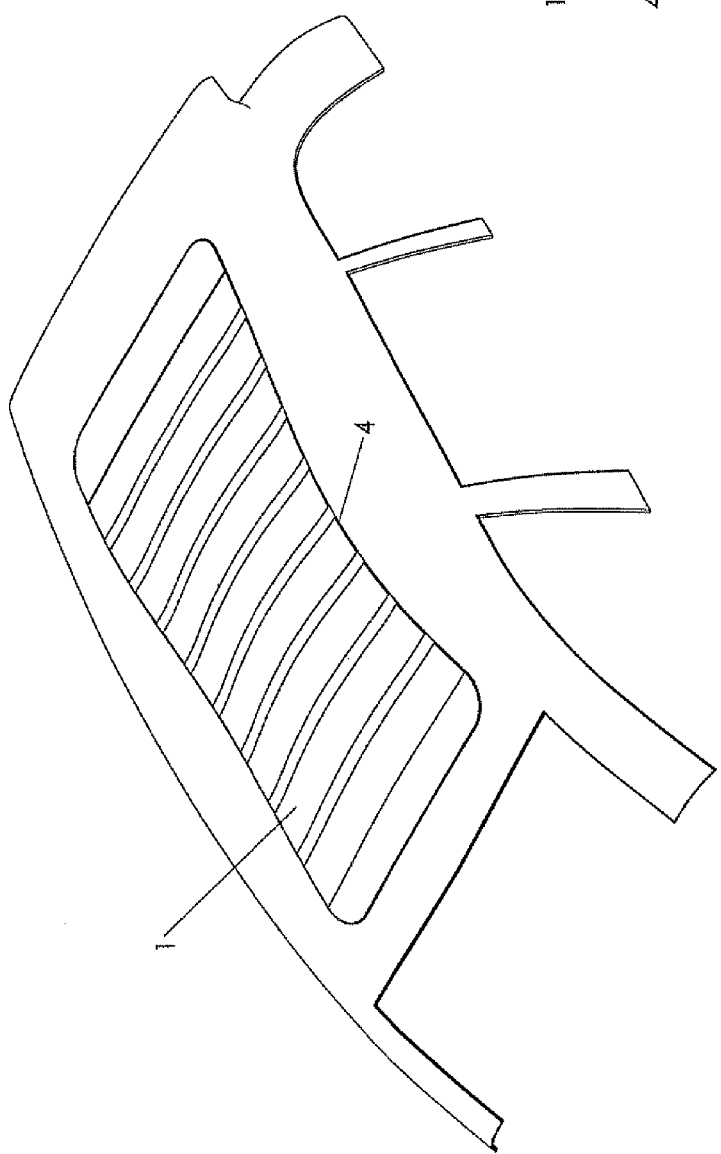
FIG. 4 is an isometric representation of the roof (perspective) with the roof closed and a path of biconcave shape.

All slats assume this original state when the roof is fully open and retracted. At least some of the slats assume this original state when the roof is partially open (or closed). The slats are transferred into a curved state (FIGS. 4 and 5) in the course of the closing operation so that they possess a high degree of stiffness when in the closed position. Thus, during the closing or opening process, or when the roof is partially open or closed, some slats may possess curvature, and others may still remain in the original state, until such time as the roof is placed in the open or closed position.

Figure 2:
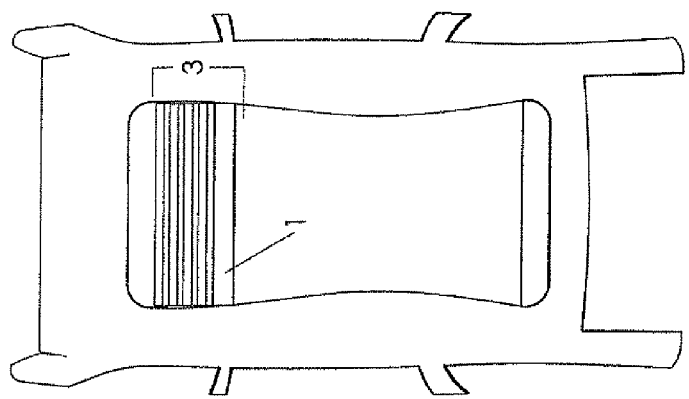
FIG. 2 is a plan view of the roof with the roof open.
Figure 3:
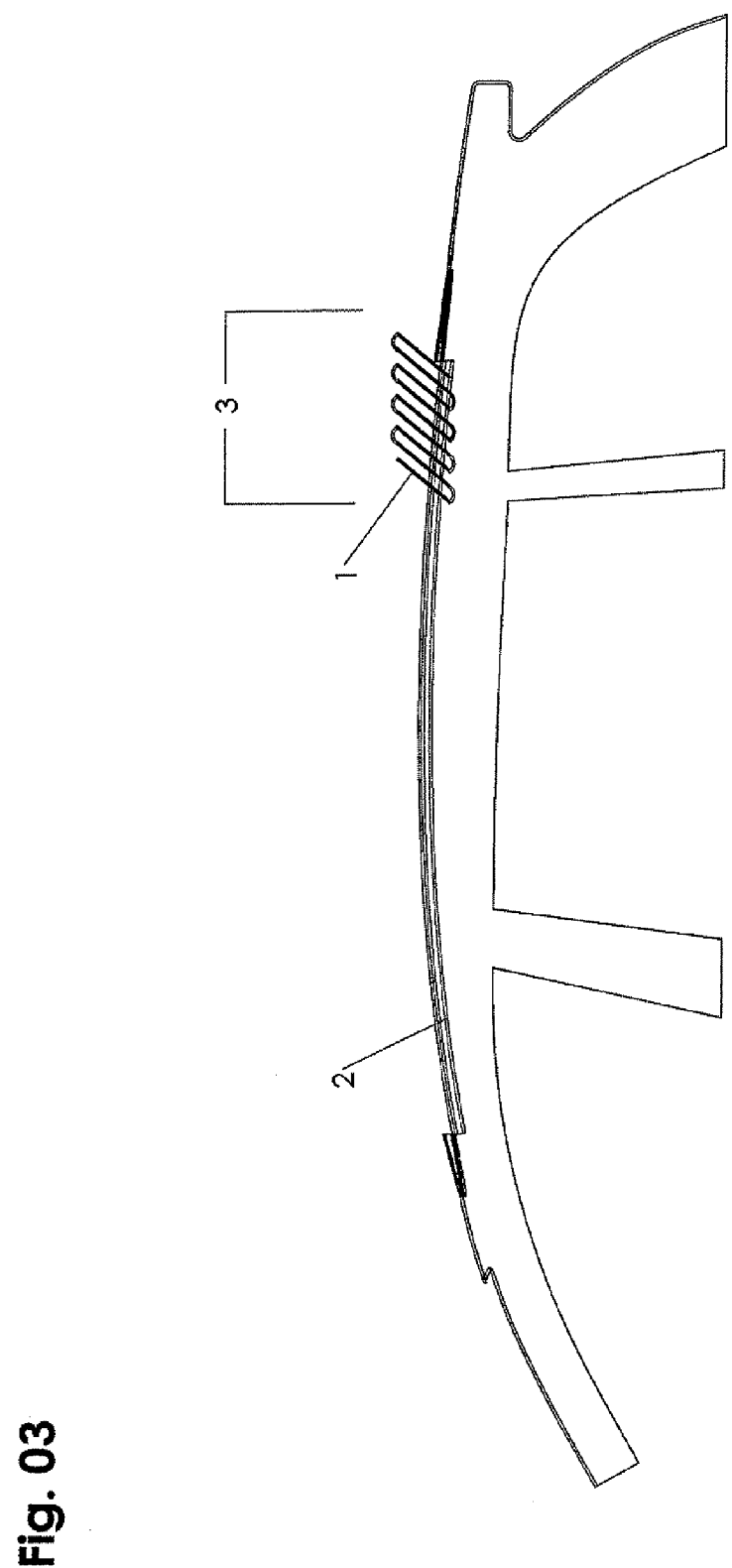
FIG. 3 illustrates a view of the roof from the side with the roof open.

The pretensioning of the slats can be achieved, when in the closed position, through the fact that the guide rails [2] converge in the longitudinal axis of the vehicle and diverge, in the region of the device for receiving the folding arrangement [3], in such a way that the slats are, to a very large extent, return into the original state again (see FIGS. 1-3).

A path of this kind may preferably be biconcave in shape [4]. When the roof is closed, all slats are compressed and a curvature develops. Through the fact that the guide rails extend in a curved manner along the geometry of the vehicle, a double curvature is achieved by way of the curvatures of the vehicle's geometry and of the slats.

Figure 7:
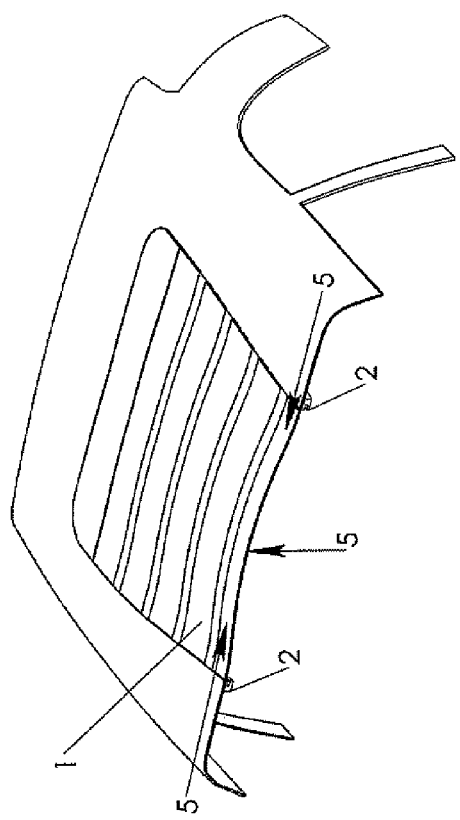
FIG. 7 illustrates a detail view of the roof in perspective, with the roof closed and a path of biconcave shape.
Figure 6:
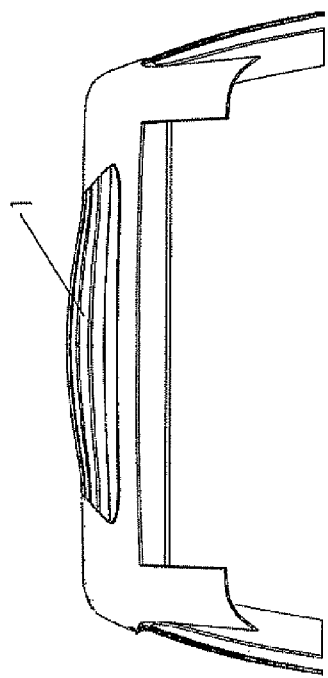
FIG. 6 illustrates a view of the roof from the front with the roof closed and a path of biconcave shape.
Figure 8:
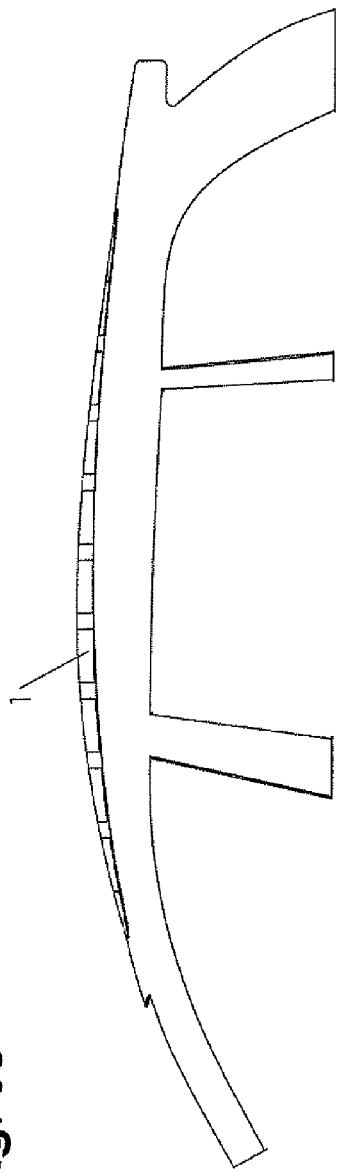
FIG. 8 is a side view of the roof with the roof closed.

In addition, the slats are subjected to bracing when in the closed position, so that the roof has a high degree of stiffness. This results in curvature such as has been represented as [5] in FIG. 7. In this form, the central slats are curved to the greatest extent (FIGS. 6 to 8). However, the roof can naturally be additionally stiffened with reinforcing materials if necessary.

This applies both to slatted roofs with slats which are connected to one another in a material-bonded and/or form-closed manner and in a loose manner, and also to continuous, cohering roof structures.

The guide rail [2] may consist of a deep plane and a further, shallow plane which extend one behind the other. The expression "one behind the other" means that there is a front and a rear plane, and the two planes extend, parallel to one another, along parts of the roof skin. The rear plane is arranged in such a way that a long peg is capable of protruding through the front plane and being guided in the rear plane. At the same time, a shorter peg can be guided in the front plane without being affected by the rear plane. This arrangement is intended to enable the pegs, which are of different lengths (and have cross-sections that differ under certain circumstances), to be guided in a targeted manner in the guide rail, i.e. initially follow a curved path and finally follow a different path in a defined region. The number of planes can naturally be varied freely; thus it is possible to add, for example, a third or even a fourth plane in order to be able, optionally, to guide individual slats differently or even individually.

The folding-up kinematics may make it necessary for at least one element to go on being guided in a "controlled" manner, and for the other to be capable of moving "freely". These planes may be formed by way of grooves. Differently shaped pegs protrude into these grooves. The path of said pegs within the planes of the guide rail is regulated by way of different peg lengths or peg widths. The longer peg runs along the deep plane, and the shorter peg runs along the shallow plane. It is thus possible, by means of the planes which lie one behind the other, to save on the height of the installation space. The grooves may also lie one above the other. The two planes extend parallel to the outer skin (roof skin) until the hood box is reached, so that the slats [1] can be displaced in the form of a continuous face. Only inside the hood box do the planes diverge from one another, for example in a V-shaped manner, so that, for example, the pegs for the deep plane continue to run along the roof contour, or horizontally in relation to the latter, and the short pegs are directed upwards.

Obviously, it is also possible for the slats to be folded up in the downward direction or centrally, contrary to the illustrations. It is likewise conceivable for the long peg to not be exclusively responsible for deflection, and for the short peg to likewise be capable of deflecting the slats.

However, the planes do not have to be activated solely by way of the length of the pegs. There is also the possibility of regulating the activation by way of different cross-sections.

The slats may be driven by, for example, a chain or a threaded rod. A cable pull should also be possible (as in conventional sliding roofs).

The pegs themselves represent both a bearing which is translatory along the guide rail and also one which is rotatory about its own axis.

Slat structures which are connected in a material-bonded and/or form-closed manner can be moved by means of these guide kinematics, however it is also conceivable that it should be possible to move individual slats, which are not connected to one another in a material-bonded and/or form-closed manner, in this way.

The folding arrangement may be manufactured in an injection-moulding process from a suitable thermoplastic, ideally polycarbonate, or even from deep-drawn sheet metal.

The folding arrangement may be manufactured, for example, by two-component injection-moulding technology, in which the slats are injected in the first step and the elastomer, such as TPU, is injected between said slats in the second step.

Another possibility lies in the technology described in Patent DE 19650854. Here too, the slats would be injected in the first step in the injection-moulding process and a reactive mixture, which reacts to a thermosetting plastic, would be injected in the second step. Instead of the thermosetting plastic used here, however, an elastomer would be used. In this case, the slats would likewise be cast in a first step, and a reactive mixture would be poured into the cavity in a second step. This reactive mixture may consist of the basic substances for a polyurethane, or of other reactive materials.

The vehicle roof described herein has high inherent stiffness without additional stiffening elements. At the same time, the smallest possible installation space is ensured when the roof is in the open or partially open state.

Thus, a vehicle roof having high inherent stiffness is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A vehicle roof having an opening, the roof comprising:
a folding arrangement having at least two slats made of plastic which are arranged parallel to one another, the folding arrangement being retractable, while being folded, in order to at least partially unblock the opening, wherein the folding arrangement closes the opening completely when in a closed position, and wherein the slats are curved as a result of bracing when in the closed position and are oriented in a substantially flat and plane-parallel manner when retracted; and
two guide rails which include a converging region in the longitudinal axis of the vehicle and a diverging region in the region of the device, such that the converging region causes the slats to curve as a result of bracing, and the diverging region permits the slats to reduce their curvature.

2. The vehicle roof according to claim 1, characterised in that, in the closed position, the slats have a curvature with a radius of 1.5 m to 4 m.

3. The vehicle roof according to claim 1, characterised in that, when retracted into the device, the slats have a curvature with a radius between infinite and 4 m.

4. The vehicle roof according to claim 1, characterised in that each slat is connected to at least one adjacent slat in a material-bonded manner by elastomer over the predominant part of their longitudinal sides.

5. The vehicle roof according to claim 4, characterised in that the elastomer is a polyurethane, a thermoplastic polyurethane or silicone.

6. The vehicle roof according to claim 1, characterised in that the vehicle roof has one of 7, 8, 9, 10, 11 or 12 slats oriented transversely to the direction of travel.

7. The vehicle roof according to claim 1, characterised in that the plastic is polycarbonate or PMMA.

* * * * *